(12) United States Patent
Slagboom et al.

(10) Patent No.: US 9,078,453 B2
(45) Date of Patent: Jul. 14, 2015

(54) METHOD AND SYSTEM FOR AUTOMATICALLY DEBONING POULTRY BREAST CAPS CONTAINING MEAT AND A SKELETAL STRUCTURE TO OBTAIN BREAST FILLETS THEREFROM

(71) Applicant: Foodmate B.V., Oud-Beijerland (NL)

(72) Inventors: Rijk Slagboom, Oud-Beijerland (NL); Jacobus Eliza Hazenbroek, Oud-Beijerland (NL)

(73) Assignee: Foodmate B.V. (NL)

( * ) Notice: Subject to any disclaimer, the term of this patent is extended or adjusted under 35 U.S.C. 154(b) by 0 days.

(21) Appl. No.: 14/504,778

(22) Filed: Oct. 2, 2014

(65) Prior Publication Data
US 2015/0126102 A1   May 7, 2015

Related U.S. Application Data

(60) Provisional application No. 61/898,622, filed on Nov. 1, 2013.

(51) Int. Cl.
*A22C 21/00* (2006.01)
(52) U.S. Cl.
CPC ........... *A22C 21/003* (2013.01); *A22C 21/0053* (2013.01); *A22C 21/0069* (2013.01); *A22C 21/0092* (2013.01)
(58) Field of Classification Search
USPC .......................... 452/125, 127–130, 132, 133
See application file for complete search history.

(56) References Cited

U.S. PATENT DOCUMENTS

| | | | |
|---|---|---|---|
| 3,956,794 | A | 5/1976 | Verbakel |
| 3,969,790 | A | 7/1976 | Smorenburg |
| 3,979,793 | A | 9/1976 | Hazenbroek |

(Continued)

FOREIGN PATENT DOCUMENTS

| | | |
|---|---|---|
| EP | 0 786 208 A1 | 7/1997 |
| EP | 0 858 739 A2 | 8/1998 |

(Continued)

OTHER PUBLICATIONS

EP Office Action dated May 26, 2014 in EP 12 703 612.7-1655.

*Primary Examiner* — Richard Price, Jr.
(74) *Attorney, Agent, or Firm* — Womble Carlyle Sandridge & Rice LLP

(57) ABSTRACT

Method of and system for automatically deboning poultry breast caps containing meat and a skeletal structure to obtain breast fillets. The method includes providing a mandrel (25) with a plane of symmetry in a vertical orientation and supporting a breast cap having a neck end and a tail end with its skeletal structure including a keel bone on top of the mandrel (25). The breast cap being held to the mandrel (25) with the keel bone aligned with the plane of symmetry. By moving the mandrel (25) through a conveying path extending through a substantially horizontal plane in a direction of travel (27) it passes a cutting implement (145) of a breast cutter (113) engaging the meat along the keel bone. The cutting implement (145) causes at least one incision along the area where the meat is attached to the keel bone and a breast fillet remover (115) downstream of the breast cutter (113) engages between the skeletal structure and the meat and separates the meat as a pair of single fillets from the skeletal structure. The arrangement is such that the mandrel (25) moves through the conveying path with the plane of symmetry aligned with the direction of travel (27).

21 Claims, 14 Drawing Sheets

(56) References Cited

U.S. PATENT DOCUMENTS

| | | |
|---|---|---|
| 3,983,601 A | 10/1976 | Verbakel |
| 3,990,128 A | 11/1976 | van Mil |
| 4,034,440 A | 7/1977 | van Mil |
| 4,118,829 A | 10/1978 | Harben, Jr. |
| 4,131,973 A | 1/1979 | Verbakel |
| 4,147,012 A | 4/1979 | van Mil |
| 4,153,971 A | 5/1979 | Simonds |
| 4,153,972 A | 5/1979 | Harben et al. |
| 4,178,659 A | 12/1979 | Simonds |
| 4,203,178 A | 5/1980 | Hazenbroek |
| 4,213,228 A * | 7/1980 | Komatsu et al. ............... 452/136 |
| 4,283,813 A | 8/1981 | House |
| 4,292,709 A | 10/1981 | van Mil |
| 4,385,419 A * | 5/1983 | Cantrell ........................ 452/135 |
| 4,388,811 A | 6/1983 | Zebarth |
| 4,395,795 A | 8/1983 | Hazenbroek |
| 4,406,037 A | 9/1983 | Hazenbroek |
| 4,418,444 A | 12/1983 | Meyn et al. |
| 4,418,445 A | 12/1983 | Meyn et al. |
| 4,434,526 A | 3/1984 | van Mil |
| 4,439,891 A | 4/1984 | van Mil |
| 4,468,838 A | 9/1984 | Sjöström et al. |
| 4,510,886 A | 4/1985 | van Mil |
| 4,514,879 A | 5/1985 | Hazenbroek |
| 4,516,290 A | 5/1985 | van Mil |
| 4,524,489 A | 6/1985 | van Mil |
| 4,558,490 A | 12/1985 | Hazenbroek et al. |
| 4,559,672 A | 12/1985 | Hazenbroek et al. |
| 4,567,624 A | 2/1986 | van Mil |
| 4,570,295 A | 2/1986 | van Mil |
| 4,574,429 A | 3/1986 | Hazenbroek |
| 4,577,368 A | 3/1986 | Hazenbroek |
| D283,289 S | 4/1986 | Hazenbroek |
| 4,593,432 A | 6/1986 | Hazenbroek |
| 4,597,133 A | 7/1986 | van den Nieuwelaar |
| 4,597,136 A | 7/1986 | Hazenbroek |
| 4,635,317 A | 1/1987 | van der Eerden |
| 4,639,973 A | 2/1987 | van der Eerden |
| 4,639,974 A | 2/1987 | Olson |
| 4,639,975 A | 2/1987 | van der Eerden |
| 4,646,384 A | 3/1987 | van der Eerden |
| 4,651,383 A | 3/1987 | van der Eerden |
| 4,653,147 A | 3/1987 | van der Eerden |
| 4,682,386 A | 7/1987 | Hazenbroek et al. |
| 4,704,768 A | 11/1987 | Hutting et al. |
| 4,716,624 A * | 1/1988 | Massey, Jr. .................. 452/135 |
| 4,723,339 A | 2/1988 | van den Nieuwelaar et al. |
| 4,724,581 A | 2/1988 | van den Nieuwelaar |
| 4,736,492 A | 4/1988 | Hazenbroek |
| RE32,697 E | 6/1988 | Hazenbroek et al. |
| 4,765,028 A | 8/1988 | van de Nieuwelaar et al. |
| 4,766,644 A | 8/1988 | van den Nieuwelaar et al. |
| 4,769,872 A | 9/1988 | Hazenbroek et al. |
| 4,779,308 A | 10/1988 | van den Nieuwelaar et al. |
| 4,788,749 A * | 12/1988 | Hazenbroek et al. ......... 452/119 |
| 4,811,456 A | 3/1989 | Heuvel |
| 4,811,458 A | 3/1989 | Nieuwelaar et al. |
| 4,811,462 A | 3/1989 | Meyn |
| 4,813,101 A | 3/1989 | Brakels et al. |
| 4,884,318 A | 12/1989 | Hazenbroek |
| 4,893,378 A | 1/1990 | Hazenbroek |
| 4,894,885 A | 1/1990 | Markert |
| 4,896,399 A | 1/1990 | Hazenbroek |
| 4,899,421 A | 2/1990 | Van Der Eerden |
| 4,918,787 A | 4/1990 | Hazenbroek |
| 4,928,351 A | 5/1990 | van den Nieuwelaar et al. |
| 4,935,990 A | 6/1990 | Linnenbank |
| 4,939,813 A | 7/1990 | Hazenbroek |
| 4,958,694 A | 9/1990 | van den Nieuwelaar et al. |
| 4,965,908 A | 10/1990 | Meyn |
| 4,972,549 A | 11/1990 | van den Nieuwelaar et al. |
| 4,993,113 A | 2/1991 | Hazenbroek |
| 4,993,114 A | 2/1991 | Meyer et al. |
| 4,993,115 A | 2/1991 | Hazenbroek |
| 5,001,812 A | 3/1991 | Hazenbroek |
| 5,013,431 A | 5/1991 | Doets |
| 5,015,213 A | 5/1991 | Hazenbroek |
| 5,019,013 A | 5/1991 | Hazenbroek |
| 5,026,983 A | 6/1991 | Meyn |
| 5,035,673 A | 7/1991 | Hazenbroek |
| 5,037,351 A | 8/1991 | van den Nieuwelaar et al. |
| 5,041,054 A | 8/1991 | van den Nieuwelaar et al. |
| 5,045,022 A | 9/1991 | Hazenbroek |
| 5,060,596 A | 10/1991 | Esbroeck |
| 5,064,402 A | 11/1991 | Koops |
| 5,067,927 A | 11/1991 | Hazenbroek et al. |
| 5,069,652 A | 12/1991 | Hazenbroek |
| 5,074,823 A | 12/1991 | Meyn |
| 5,088,959 A | 2/1992 | Heemskerk |
| 5,090,940 A | 2/1992 | Adkison |
| 5,098,333 A | 3/1992 | Cobb |
| 5,104,351 A | 4/1992 | van den Nieuwelaar et al. |
| 5,122,090 A | 6/1992 | van den Nieuwelaar et al. |
| 5,123,871 A | 6/1992 | van den Nieuwelaar et al. |
| 5,125,498 A | 6/1992 | Meyn |
| 5,147,240 A | 9/1992 | Hazenbroek et al. |
| 5,147,241 A | 9/1992 | Rudin |
| 5,154,664 A | 10/1992 | Hazenbroek et al. |
| 5,154,665 A | 10/1992 | Hazenbroek |
| RE34,149 E | 12/1992 | Markert |
| 5,173,076 A | 12/1992 | Hazenbroek |
| 5,173,077 A | 12/1992 | van den Nieuwelaar et al. |
| 5,176,563 A | 1/1993 | van den Nieuwelaar et al. |
| 5,176,564 A | 1/1993 | Hazenbroek |
| 5,178,890 A | 1/1993 | van den Nieuwelaar et al. |
| 5,186,679 A | 2/1993 | Meyn |
| 5,188,559 A | 2/1993 | Hazenbroek |
| 5,188,560 A | 2/1993 | Hazenbroek |
| 5,194,035 A | 3/1993 | Dillard |
| 5,197,917 A | 3/1993 | Verbakel et al. |
| 5,199,922 A | 4/1993 | Korenberg et al. |
| 5,222,905 A | 6/1993 | Van den Nieuwelaar et al. |
| 5,242,324 A | 9/1993 | Koops |
| 5,248,277 A | 9/1993 | Bos et al. |
| 5,256,101 A | 10/1993 | Koops |
| 5,269,721 A | 12/1993 | Meyn |
| 5,273,485 A | 12/1993 | Hegelmann et al. |
| 5,277,649 A | 1/1994 | Adkison |
| 5,277,650 A | 1/1994 | Meyn |
| 5,279,517 A | 1/1994 | Koops |
| 5,290,187 A | 3/1994 | Meyn |
| 5,299,975 A | 4/1994 | Meyn |
| 5,299,976 A | 4/1994 | Meyn |
| 5,314,374 A * | 5/1994 | Koch et al. .................... 452/136 |
| 5,318,428 A | 6/1994 | Meyn |
| 5,326,311 A | 7/1994 | Persoon et al. |
| 5,334,083 A | 8/1994 | van den Nieuwelaar et al. |
| 5,336,127 A | 8/1994 | Hazenbroek |
| 5,340,351 A | 8/1994 | Minderman et al. |
| 5,340,355 A | 8/1994 | Meyn |
| 5,342,237 A | 8/1994 | Kolkman |
| 5,344,359 A | 9/1994 | Kolkman |
| 5,344,360 A | 9/1994 | Hazenbroek |
| 5,366,406 A | 11/1994 | Hobbel et al. |
| 5,368,520 A * | 11/1994 | Koch et al. .................... 452/165 |
| 5,370,574 A | 12/1994 | Meyn |
| 5,372,246 A | 12/1994 | van Aalst |
| RE34,882 E | 3/1995 | Meyn |
| 5,429,549 A | 7/1995 | Verrijp et al. |
| 5,439,702 A | 8/1995 | French |
| 5,453,045 A | 9/1995 | Hobbel et al. |
| 5,462,477 A | 10/1995 | Ketels |
| 5,470,194 A | 11/1995 | Zegers |
| 5,487,700 A | 1/1996 | Dillard |
| 5,505,657 A | 4/1996 | Janssen et al. |
| 5,549,521 A | 8/1996 | van den Nieuwelaar et al. |
| D373,883 S | 9/1996 | Dillard |
| 5,569,067 A | 10/1996 | Meyn |
| 5,595,066 A | 1/1997 | Zwanikken et al. |
| 5,605,503 A | 2/1997 | Martin |
| 5,643,072 A | 7/1997 | Lankhaar et al. |
| 5,643,074 A | 7/1997 | Linnenbank |
| 5,672,098 A | 9/1997 | Veraart |
| 5,676,594 A | 10/1997 | Joosten |

(56) References Cited

U.S. PATENT DOCUMENTS

| | | | |
|---|---|---|---|
| 5,704,830 | A | 1/1998 | Van Ochten |
| 5,713,786 | A | 2/1998 | Kikstra |
| 5,713,787 | A | 2/1998 | Schoenmakers et al. |
| 5,741,176 | A | 4/1998 | Lapp et al. |
| 5,755,617 | A | 5/1998 | van Harskamp et al. |
| 5,759,095 | A | 5/1998 | van Harskamp et al. |
| 5,766,063 | A | 6/1998 | Hazenbroek et al. |
| 5,782,685 | A | 7/1998 | Hazenbroek et al. |
| 5,785,588 | A | 7/1998 | Jacobs et al. |
| 5,803,802 | A | 9/1998 | Jansen |
| 5,810,651 | A | 9/1998 | De Heer et al. |
| 5,810,653 | A | 9/1998 | Van Craaikamp et al. |
| 5,813,908 | A | 9/1998 | Craaikamp |
| 5,827,116 | A | 10/1998 | Al et al. |
| 5,833,527 | A | 11/1998 | Hazenbroek et al. |
| 5,865,672 | A | 2/1999 | Hazenbroek |
| 5,875,738 | A | 3/1999 | Hazenbroek et al. |
| 5,947,811 | A | 9/1999 | Hazenbroek et al. |
| 5,951,393 | A | 9/1999 | Barendregt |
| 5,975,029 | A | 11/1999 | Morimoto et al. |
| 5,976,004 | A | 11/1999 | Hazenbroek |
| 5,980,377 | A | 11/1999 | Zwanikken et al. |
| 6,007,416 | A | 12/1999 | Janssen et al. |
| 6,007,417 | A | 12/1999 | Jones et al. |
| 6,024,636 | A | 2/2000 | Hazenbroek et al. |
| 6,027,403 | A | 2/2000 | Hazenbroek et al. |
| 6,027,404 | A | 2/2000 | Wols |
| 6,029,795 | A | 2/2000 | Janssen et al. |
| 6,062,972 | A | 5/2000 | Visser |
| 6,095,914 | A | 8/2000 | Cornelissen et al. |
| 6,126,534 | A | 10/2000 | Jacobs et al. |
| 6,132,304 | A | 10/2000 | Aarts et al. |
| 6,142,863 | A | 11/2000 | Janssen et al. |
| 6,152,816 | A | 11/2000 | van den Nieuwelaar et al. |
| 6,176,772 | B1 | 1/2001 | Hazenbroek et al. |
| 6,179,702 | B1 | 1/2001 | Hazenbroek |
| 6,190,250 | B1 | 2/2001 | Volk et al. |
| 6,193,595 | B1 | 2/2001 | Volk et al. |
| 6,220,953 | B1 | 4/2001 | Cornelissen et al. |
| 6,231,436 | B1 | 5/2001 | Bakker |
| 6,254,471 | B1 | 7/2001 | Meyn |
| 6,254,472 | B1 | 7/2001 | Meyn |
| 6,277,021 | B1 | 8/2001 | Meyn |
| 6,283,847 | B1 * | 9/2001 | Berry et al. .......... 452/136 |
| 6,299,524 | B1 | 10/2001 | Janssen et al. |
| 6,306,026 | B1 | 10/2001 | Post |
| 6,322,438 | B1 | 11/2001 | Barendregt |
| 6,358,136 | B1 | 3/2002 | Volk et al. |
| 6,371,843 | B1 | 4/2002 | Volk et al. |
| 6,375,560 | B1 | 4/2002 | Verrijp |
| 6,383,069 | B1 | 5/2002 | Volk et al. |
| 6,398,636 | B1 | 6/2002 | Jansen et al. |
| 6,446,352 | B2 | 9/2002 | Middelkoop et al. |
| 6,478,668 | B2 | 11/2002 | Visser et al. |
| 6,599,179 | B1 | 7/2003 | Hazenbroek et al. |
| 6,612,919 | B2 | 9/2003 | Janset et al. |
| 6,656,032 | B2 | 12/2003 | Hazenbroek et al. |
| 6,688,461 | B1 * | 2/2004 | Frazier et al. ........ 198/867.09 |
| 6,726,556 | B2 | 4/2004 | Gooren et al. |
| 6,736,717 | B1 | 5/2004 | Annema et al. |
| 6,764,393 | B1 | 7/2004 | Hazenbroek et al. |
| 6,783,451 | B2 | 8/2004 | Aandewiel et al. |
| 6,811,478 | B2 | 11/2004 | van den Nieuwelaar et al. |
| 6,811,480 | B2 | 11/2004 | Moriarty |
| 6,811,802 | B2 | 11/2004 | van Esbroeck et al. |
| 6,830,508 | B2 | 12/2004 | Hazenbroek et al. |
| 6,837,782 | B2 | 1/2005 | Hetterscheid et al. |
| 6,899,613 | B2 | 5/2005 | van den Nieuwelaar et al. |
| 6,912,434 | B2 | 6/2005 | van den Nieuwelaar et al. |
| 6,986,707 | B2 | 1/2006 | van den Nieuwelaar et al. |
| 7,018,283 | B2 | 3/2006 | Schmidt et al. |
| 7,029,387 | B2 | 4/2006 | van den Nieuwelaar et al. |
| 7,059,954 | B2 | 6/2006 | Annema et al. |
| 7,063,611 | B2 | 6/2006 | Nolten et al. |
| 7,066,806 | B2 | 6/2006 | de Heer et al. |
| 7,070,493 | B2 | 7/2006 | Hazenbroek et al. |
| 7,115,030 | B2 | 10/2006 | van Hillo et al. |
| 7,125,330 | B2 | 10/2006 | Beeksma et al. |
| 7,128,937 | B2 | 10/2006 | van den Nieuwelaar et al. |
| 7,133,742 | B2 | 11/2006 | Cruysen et al. |
| 7,172,781 | B2 | 2/2007 | Kish |
| 7,232,365 | B2 | 6/2007 | Annema et al. |
| 7,232,366 | B2 | 6/2007 | van den Nieuwelaar et al. |
| 7,249,998 | B2 | 7/2007 | van Esbroeck et al. |
| 7,261,629 | B2 | 8/2007 | Holleman |
| 7,284,973 | B2 | 10/2007 | van Esbroeck et al. |
| 7,302,885 | B2 | 12/2007 | Townsend |
| 7,344,437 | B2 | 3/2008 | van den Nieuwelaar et al. |
| D565,941 | S | 4/2008 | Peters et al. |
| 7,357,707 | B2 | 4/2008 | de Vos et al. |
| 7,476,148 | B2 | 1/2009 | McQuillan et al. |
| 7,494,406 | B2 | 2/2009 | Van Esbroeck et al. |
| 7,530,888 | B2 | 5/2009 | Annema et al. |
| 7,572,176 | B2 | 8/2009 | Petersen et al. |
| 7,662,033 | B1 | 2/2010 | Ritter et al. |
| 7,662,034 | B2 | 2/2010 | Van Hillo et al. |
| 7,717,773 | B2 | 5/2010 | Woodford et al. |
| 7,740,527 | B1 | 6/2010 | Harben |
| 7,744,449 | B2 | 6/2010 | van Esbroeck et al. |
| 7,824,251 | B2 | 11/2010 | van den Nieuwelaar et al. |
| 2001/0023171 | A1 | 9/2001 | Hazenbroek et al. |
| 2002/0055328 | A1 | 5/2002 | Schmidt et al. |
| 2002/0058470 | A1 | 5/2002 | Schmidt et al. |
| 2002/0090905 | A1 | 7/2002 | Moriarty |
| 2002/0168930 | A1 | 11/2002 | Jansen et al. |
| 2003/0008606 | A1 | 1/2003 | Hazenbroek et al. |
| 2003/0084856 | A1 | 5/2003 | Hazenbroek et al. |
| 2003/0092372 | A1 | 5/2003 | Aandewiel et al. |
| 2004/0198209 | A1 | 10/2004 | Hazenbroek et al. |
| 2004/0235409 | A1 | 11/2004 | Nolten et al. |
| 2005/0037704 | A1 | 2/2005 | Heer et al. |
| 2005/0037705 | A1 | 2/2005 | Beeksma et al. |
| 2005/0048894 | A1 | 3/2005 | van Hillo et al. |
| 2005/0186897 | A1 | 8/2005 | Holleman |
| 2005/0221748 | A1 | 10/2005 | Hillo et al. |
| 2006/0099899 | A1 | 5/2006 | Hazenbroek et al. |
| 2006/0217051 | A1 | 9/2006 | Gerrits |
| 2007/0082595 | A1 | 4/2007 | de Vos et al. |
| 2007/0221071 | A1 | 9/2007 | Kuijpers et al. |
| 2007/0224306 | A1 | 9/2007 | van Esbroeck et al. |
| 2008/0017050 | A1 | 1/2008 | van Esbroeck et al. |
| 2008/0125025 | A1 | 5/2008 | Van Den Nieuwelaar et al. |
| 2008/0171506 | A1 | 7/2008 | Nieuwelaar et al. |
| 2009/0239457 | A1 | 9/2009 | Jansen et al. |
| 2009/0320761 | A1 | 12/2009 | Grave et al. |
| 2010/0022176 | A1 | 1/2010 | Van De Nieuwelaar et al. |
| 2010/0029186 | A1 | 2/2010 | Janssen et al. |
| 2010/0048114 | A1 | 2/2010 | Van Den Nieuwelaar et al. |
| 2010/0062699 | A1 | 3/2010 | Sorensen et al. |
| 2010/0075584 | A1 | 3/2010 | Aandewiel et al. |
| 2010/0081366 | A1 | 4/2010 | De Vos et al. |
| 2010/0120344 | A1 | 5/2010 | Van Den Nieuwelaar et al. |
| 2010/0151779 | A1 | 6/2010 | Bakker |
| 2010/0221991 | A1 | 9/2010 | Hagendoorn |

FOREIGN PATENT DOCUMENTS

| EP | 2 181 841 A1 | 5/2010 |
|---|---|---|
| EP | 2384643 A1 | 11/2011 |

* cited by examiner

METHOD AND SYSTEM FOR AUTOMATICALLY DEBONING POULTRY BREAST CAPS CONTAINING MEAT AND A SKELETAL STRUCTURE TO OBTAIN BREAST FILLETS THEREFROM

REFERENCE TO RELATED APPLICATION

Priority is hereby claimed to the filing date of U.S. provisional patent application 61/898,662 entitled Method and System for Automatically Deboning Poultry Breast Caps Containing Meat and a Skeletal Structure to Obtain Breast Fillets Therefrom, which was filed on 1 Nov. 2013.

TECHNICAL FIELD

The present invention relates to a method and a system for automatically deboning poultry breast caps containing meat and a skeletal structure for obtaining breast fillets.

BACKGROUND

It is known for automatically deboning to mount poultry breast caps on mandrels and to move these mandrels by an endless conveyor through a number of processing stations. To reduce the required floor space for this equipment the conveyor is looped about spaced sprockets with straight conveyor sections extending in a vertical plane one above the other. When processing stations are arranged along both the upper and lower conveyor sections the floor space requirement can be optimized. Automatic breast cap deboners that use this principle are known from U.S. Pat. No. 4,557,017, U.S. Pat. No. 4,873,746 and EP 0207553. In these known methods and apparatuses the mandrels are upside down when in the lower conveyor section. It has since been found that processing breast caps when suspended upside down from mandrels and prone to gravity leads to critically complex processing stations, which is reflected in their frequent necessary maintenance and adjustment. There has been some benefit in de-skinning when the breast caps are inversed. Nonetheless de-skinning is best done in a direction from the tail end to the head end of a breast cap. However in these known conveyor systems the mandrels are conveyed over the de-skinning units with the head end of the breast cap leading, which has resulted in less than optimal de-skinning results.

Accordingly it is an object of the present invention to propose an improved method and system for automatically deboning poultry breast caps containing meat and a skeletal structure to obtain breast fillets therefrom. In particular a method and system that is economic in floor space requirements, but which keeps the mandrels in an upright position, except for de-skinning. Furthermore it is an object to perform de-skinning from the tail end to the head end. In a more general sense it is thus an object of the invention to overcome or ameliorate at least one of the disadvantages of the prior art. It is also an object of the present invention to provide alternative structures which are less cumbersome in assembly and operation and which moreover can be made relatively inexpensively. Alternatively it is an object of the invention to at least provide the public with a useful alternative.

To accomplish these objects the invention provides for a method and an system as defined by the appended claims.

SUMMARY

In particular the method of automatically deboning poultry breast caps containing meat and a skeletal structure to obtain breast fillets therefrom, includes steps of: providing a mandrel having a plane of symmetry in vertical orientation; supporting a breast cap having a neck end and a tail end with its skeletal structure including a keel bone on top of the mandrel; holding the breast cap to the mandrel with the keel bone aligned with the plane of symmetry of the mandrel; moving the mandrel through a conveying path that extends through a substantially horizontal plane; providing a breast cutter in the conveying path; moving the mandrel through a conveying path in a direction of travel to pass the breast cutter for engagement with the meat along the keel bone; providing at least one incision along the area where the meat is attached to the keel bone; providing a breast fillet remover downstream of the breast cutter; allowing the breast fillet remover to engage between the skeletal structure on the mandrel and the meat; and separating the meat as a pair of single fillets from the skeletal structure, wherein the mandrel is being moved through the conveying path with the plane of symmetry aligned with the direction of travel. Within particular the conveying path extending through a substantially horizontal plane and the plane of symmetry of the mandrels aligned with the direction of travel it is possible to perform the majority of meat processing steps with the breast caps supported in a gravity neutral position. This is also an advantage when removing single fillets from the respective sides of a breast cap. It can further be advantageous when the method further includes a step of de-skinning prior to moving the mandrel to pass the breast cutter. In this regard it will be preferred when the mandrel is being moved through the conveying path with the neck end of the breast cap leading and the tail end trailing, but wherein prior to engagement of the meat with the breast cutter the mandrel, within its plane of symmetry, is brought into an upside-down position with the tail end of the breast cap leading for de-skinning and returned back again to its initial position after passing the de-skinner. It can then further be advantageous, when the method further includes a step of pre-cutting the neck end prior to the step of de-skinning.

When the method further comprises unloading the skeletal structure from the mandrel after separating of the meat therefrom, the mandrels can conveniently be returned to a loading section and be used again.

It may further be advantageous when the breast cutter includes a cutting implement that preferably includes a pair of spaced parallel cutting blades for providing a pair of spaced parallel incisions along the area where the meat is attached to the keel bone. This will result in the fillets being cleaner and not needing any further manual labor.

The invention also relates to a system for performing the above recited method steps. Such a system may conveniently comprise an endless conveyor arranged in a substantially horizontal plane and including a pair of substantially parallel straight sections, which are joined by opposite first and second curved sections extending about spaced first and second conveyor wheels. Such a system furthermore may comprise a conveyor chain and a plurality of mandrels entrained for movement through the conveying path in the direction of travel by the conveyor chain. The conveyor chain may preferably be of a type including individual chain links and each mandrel may then be associated with an intermediate chain link, between a leading chain link and a trailing chain link. In this manner each intermediate chain link can support a Maltese cross that is arranged to be rotatable in a vertical plane between at least two indexed positions. In such an arrangement the mandrel is advantageously fixedly connected to the Maltese cross by a shaft to extend with its plane of symmetry parallel to the plane of rotation of the Maltese cross. Inwardly extending diagonal slots in the Maltese cross are then adapted to engage detents along a bottom edge of a guide channel for guiding and supporting the conveyor chain in a straight section of the conveyor. Engagement of the detents and the diagonal slots will then cause each mandrel to turn through 180° in its plane of symmetry.

In general such systems may also be arranged to comprise a loading section for loading poultry breast caps onto mandrels and at least two compartments that are each adapted to selectively receive optional equipment, such as at least one exchangeable meat processing module. The at least one exchangeable meat processing module in particular may include a breast splitter and deboner unit, and optionally further include a de-skinner unit, arranged to be received in one of the at least two compartments in optional operative and non-operative modes. For such a proposed system the deboner unit in the direction of travel may include a bone centering device, a breast cutter, and a breast fillet remover. The bone centering device may conveniently comprises a stationary central guide for guiding breast caps in a vertical direction and a pair of centering blocks oppositely movable transverse to the direction of travel for centering wishbones in the breast caps. Also the breast cutter may include the cutting implement in the form of rotatable double circular cutting blade. The breast fillet remover preferably may include complementary first and second tunnel plates mounted for limited individual swiveling movement.

BRIEF DESCRIPTION OF THE DRAWINGS

Further advantageous aspects of the invention will become clear from the appended description and in reference to the accompanying drawings, in which.

DETAILED DESCRIPTION

Figure 1:
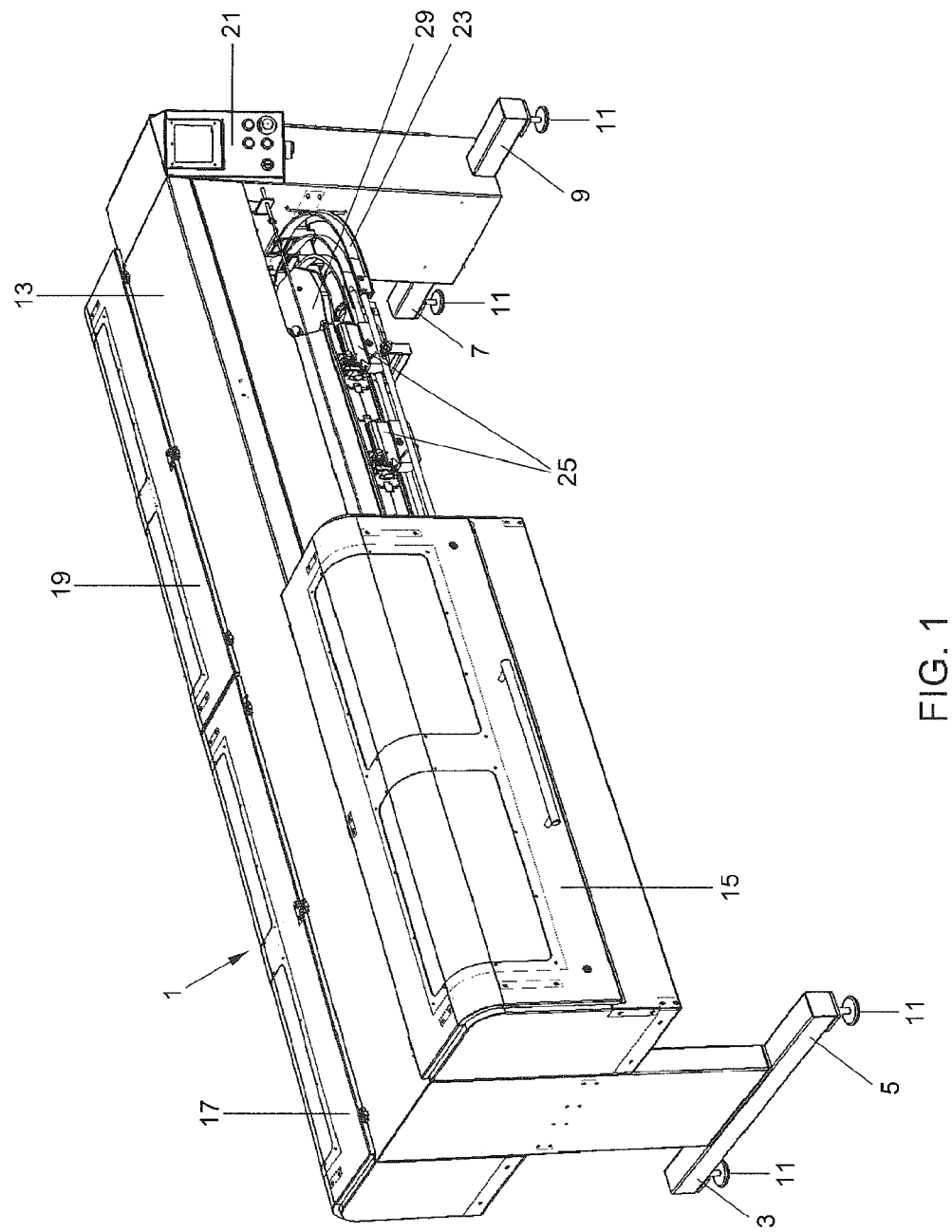
FIG. 1 is an isometric view of a machine suitable for performing the method according to the invention.

FIG. 1 is a perspective view of a machine for performing the method according to the invention. The machine 1 on opposite ends is provided with legs 3, 5, 7, 9. The legs 3-9 are each provided with a pedestal 11, at least one of which is adjustable to enable leveling of the machine with respect to a workspace floor surface. The machine 1 also includes a main body 13 onto which are hinged a front door 15, a first rear door 17, and a second rear door 19. The main body 13 also is provided with a control panel 21. Arranged within the machine 1 is an endless conveyor 23 for breast cap carrying mandrels 25. A portion of the conveyor track 23, as shown in FIG. 1, is exposed and not covered by a door. This section enables loading of the mandrels 25 with poultry breast caps.

Figure 2:
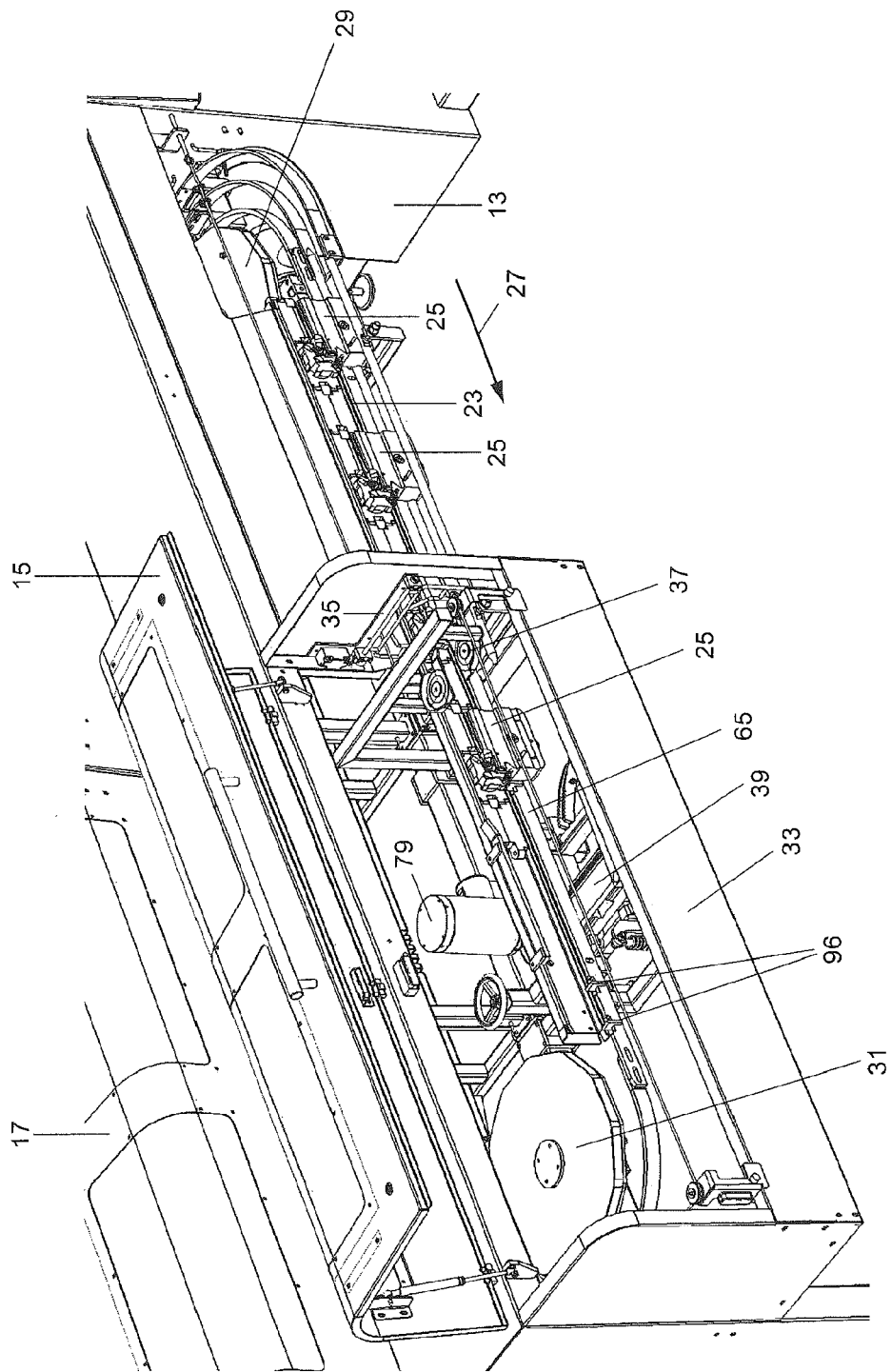
FIG. 2 illustrates a front portion of the machine of FIG. 1.

In FIG. 2 the front portion of the machine 1 is shown with the front door 15 in an open position. The mandrels 25 are moved by the conveyor 23 in the direction of arrow 27. The conveyor 23 is moved by a driven conveyor wheel 29 through one return loop and is guided through an opposite return loop about an idler conveyor wheel 31. In a first compartment 33 that can be covered by the front door 15 are housed an infeed guard 35, a pre-cutter 37, and a de-skinner 39.

Figure 3:
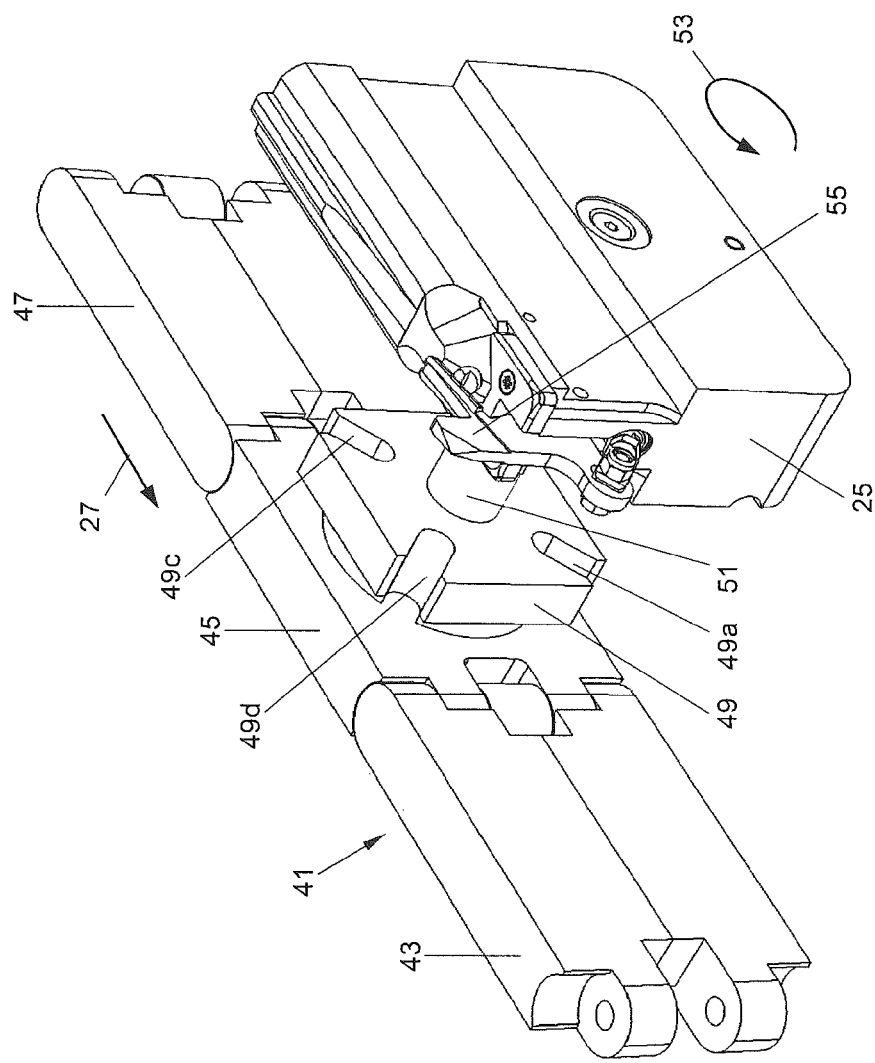
FIG. 3 shows a portion of a conveyor chain as used in the machine of FIG. 1.

In FIG. 3 a portion of a conveyor chain 41 with an associated mandrel 25 is shown on an enlarged scale. Each mandrel 25 has an associated pitch of three individual chain links 43, 45, 47. Intermediate chain link 45 is interposed between leading chain link 43 and trailing chain link 47. A succession of chain links pivotally interconnecting leading chain links 43 to respective trailing chain links 47 forms an endless conveyor chain 41. For movement in the direction of arrow 27 the conveyor chain 41 will be engaged by driven wheel 29 (as shown in FIGS. 1 and 2). The intermediate chain link 45 is provided with a bearing for rotatingly supporting Maltese cross 49, which is non-rotatingly connected to the mandrel 25 through a shaft 51. When the Maltese cross 49 is rotated in the direction of arrow 53, the mandrel 25 will rotate with it in the same direction. The Maltese cross 49 is further provided with diagonal, inwardly directed slots 49a, 49b, 49c, 49d for a purpose to be explained herein below. The mandrel 25 is further provided with a spring-biased clamp 55 for clampingly holding a central bone of a poultry breast cap (non-shown, but conventional). In the position of the mandrel 25 as shown in FIG. 3 the breast cap meat depends from opposite sides of the mandrel 25, which defines a plane of symmetry that extends perpendicular to the shaft 51. The plane of symmetry of the mandrel 25 thus is always kept in a vertical position and a breast cap is supported on the mandrel 25 in a gravity neutral manner. This is important, so that there is no bias on the meat of the breast cap in a lateral direction. The mandrels 25 can be generally of a type as described in U.S. Pat. No. 5,045,024.

Figure 4:
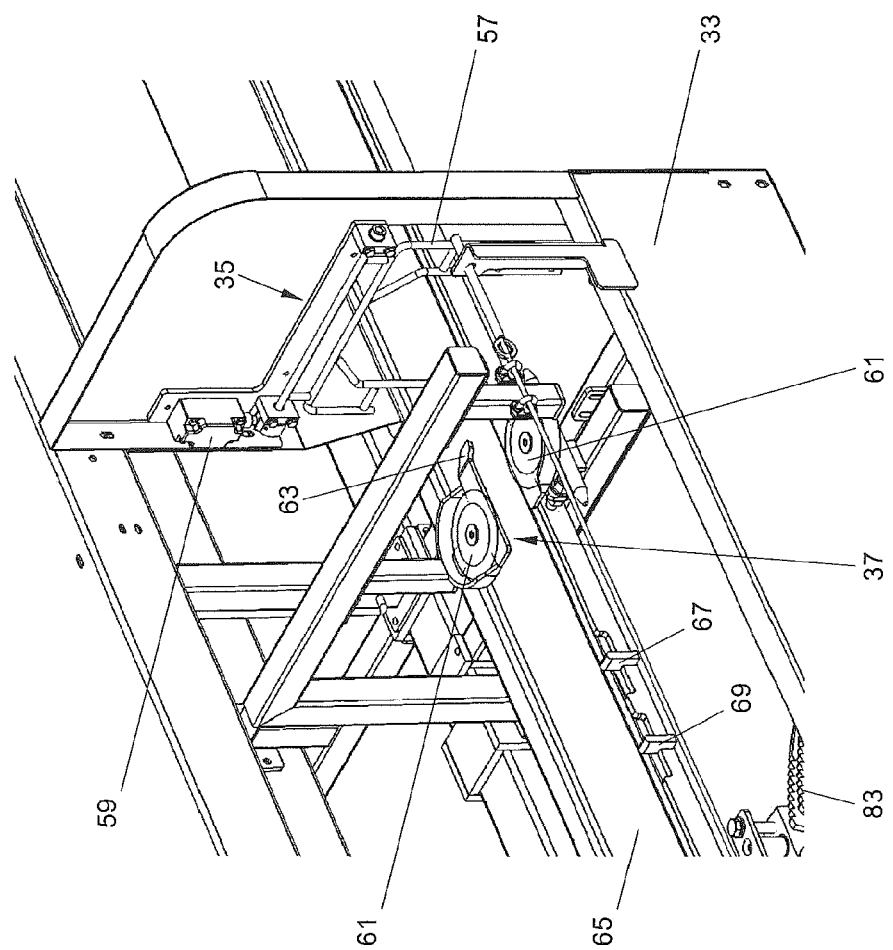
FIG. 4 shows a detail of FIG. 2 on an enlarged scale.

FIG. 4 is an enlarged detail of an entrance side of the first compartment 33. Associated with this entrance side is the infeed guard 35, which includes a pivotally suspended contour gate 57 that normally hangs vertically. Should for some reason a poultry breast cap be wrongly positioned on a mandrel, or some other part larger than a breast cap enter the first compartment 33, then the contour gate 57 will sway out of its vertical position and interrupt the electric power to the machine through switch 59. In FIG. 4 the conveyor chain and mandrels are deleted for clarity, but these will take the position as illustrated in the pre-cutter 37 which includes a pair of opposed circular cutting blades 61 and infeed guides 63. For guiding of the chain links 43, 45, 47 and the Maltese cross 49 a guide channel 65 extends along the first compartment 33 and beyond, to guide and support the conveyor chain 41 between its driven and idler wheels 29, 31. The Maltese cross 49 is guided by a bottom edge of the guide channel 65.

Figure 5:
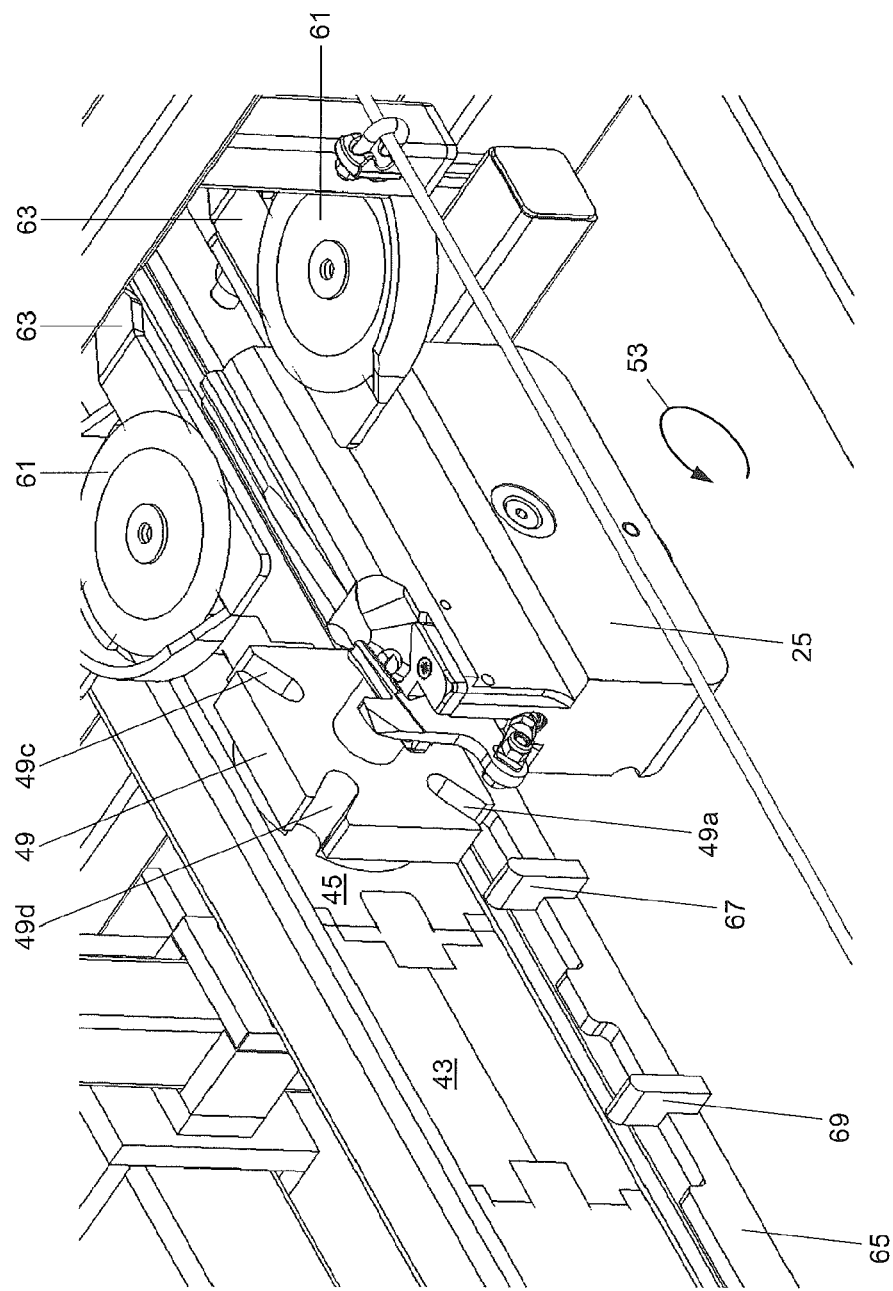
FIG. 5 is another enlarged detail of FIG. 2.

As best shown in FIG. 5 the guide channel 65 in recessed portions along the bottom edge thereof is provided with a first detent 67 and second detent 69. The first and second detents 67, 69 are successively engaged by one of slots 49a, 49b, 49c or 49d of the Maltese cross 49, resulting in the mandrel 25 to turn through 180° in the direction of arrow 53 and in its plane of symmetry. In this position the mandrel 25 is upside-down with the breast cap loaded on the mandrel being advanced with its tail end leading and its neck end trailing. After being turned by the first and second detents 67, 69 the mandrels are moving over the de-skinner 39, shown in FIG. 2 and in more detail in FIGS. 6 and 7.

Figure 6:
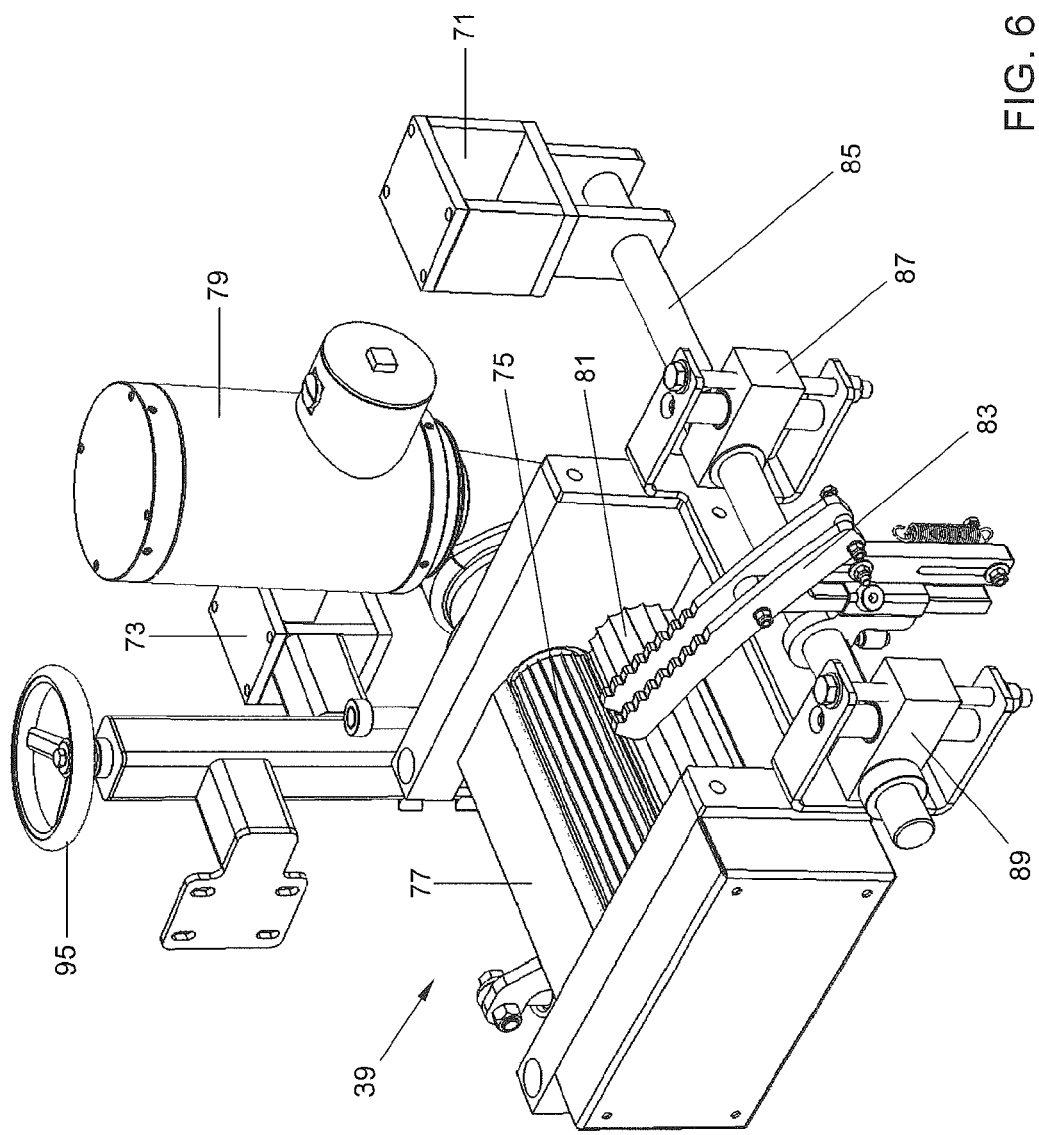
FIG. 6 shows a de-skinner unit detached from the machine of FIG. 1 as seen from an upstream direction.
Figure 7:
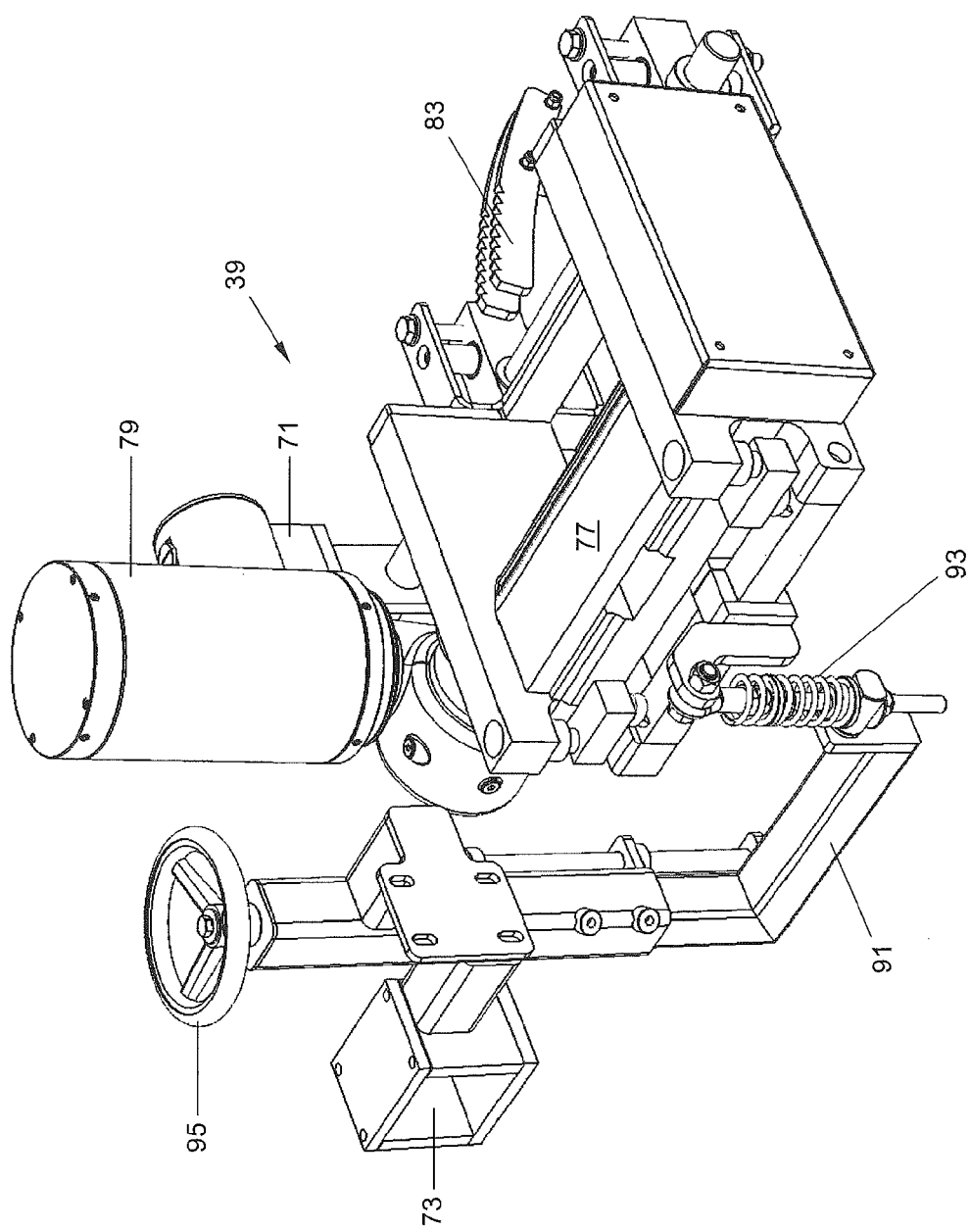
FIG. 7 shows the de-skinner unit of FIG. 6 from a downstream point of view.

FIG. 6 shows the de-skinner 39 detached form the machine from an upstream point of view and FIG. 7 shows the de-skinner 39 detached from the machine from a downstream point of view. The de-skinner 39 is built as a unit that can be attached to the main body 13 of the machine 1 by mounting consoles 71, 73. The de-skinner 39 has a gripper roller 75 driven to rotate in close proximity to a knife blade 77. Between the gripper roller 75 and the knife blade 77 a gap is formed for grasping the skin from the breast cap. The gripper roller 75 therefore is provided with axially extending serrations about its outer perimeter surface. The gripper roller 75 is driven by a motor unit 79 so that its surface speed in the direction of the knife blade 77 preferably exceeds the speed of the conveyor 23. For cleaning remaining skin and/or fat from the gripper roller 75, a cleaning roller 81 is driven by motor unit 79 in the same direction of rotation. The opposite confronting surfaces of the gripper roller 75 and the cleaning roller 81 thereby move in opposite directions. The cleaning roller 81 is preferably arranged to be driven at a higher speed than the gripper roller 75. The cleaning roller 81 is also provided with axially extending serrations on its outer surface, which are generally coarser than those of the gripper roller 75.

The de-skinner 39 is height and angularly adjustable with respect to its mounting consoles 71, 73 for optimal de-skinning and to be bypassed when breast caps are processed that have already been de-skinned in advance or need not be de-skinned. At the upstream infeed end of the de-skinner 39 a guide cam 83 is adjustably positioned to guide the tail skin into the gap between the gripper roller 75 and the knife blade 77. The de-skinner 39 is pivotally mounted about a shaft 85, connected to the mounting console 71, through adjustable sleeves 87, 89. A downstream end of the de-skinner 39 is adjustable for elevation and for being bypassed through a telescoping arm 91 that supports a downstream end of the de-skinner 39 through a compression spring 93. The telescoping arm 91 is vertically adjustable in respect of the mounting console 73 by means of a hand wheel 95.

As best seen in FIG. 2, there is provided a further pair of detents 96 downstream of the de-skinner 39. This further pair of detents 96 positioned again along the bottom edge of the guide channel 65 successively engages two of the diagonal slots 49a-49d to turn a passing mandrel 25 again through 180° to bring it back in its upside position. The further progress along the conveyor path is again with the neck end of the breast cap leading and the tail end trailing.

Figure 8:
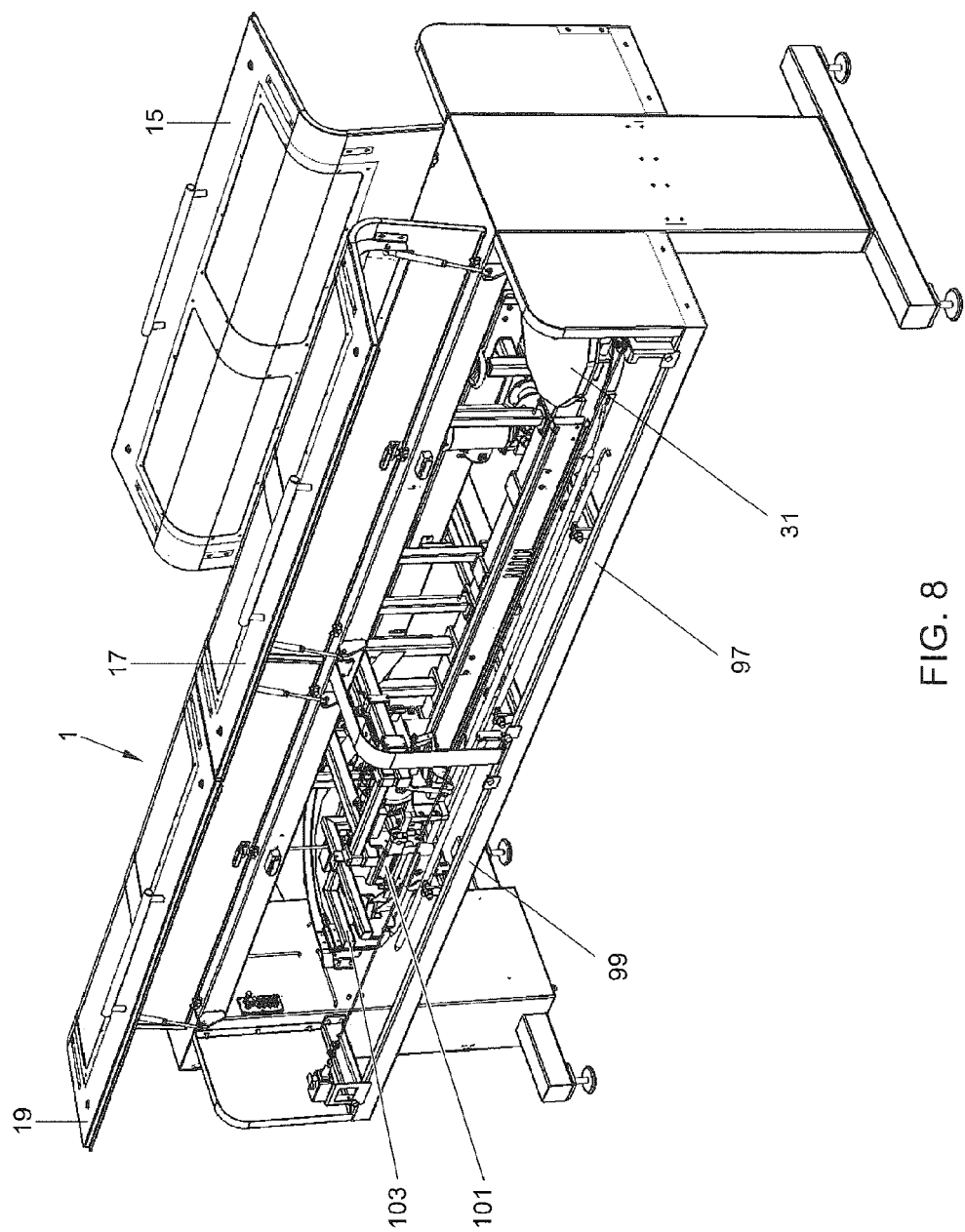
FIG. 8 is a perspective view of a reverse side of the machine of FIG. 1.

In FIG. 8 a perspective view of a reverse side of the machine 1 with opened first and second rear doors 17, 19 is shown. The first rear door 17 opens up a first rear bay in the form of second compartment 97, which may be occupied by optional, preferably modular and exchangeable, equipment for harvesting inner fillets, also called tenders. In the presently described embodiment this second compartment 97 is not used, but it adds to the versatility of the machine that the number and arrangement of meat processing units can be altered for different purposes. The second rear door 19 provides access to a second rear bay in the form of third compartment 99, which accommodates a breast splitter and deboner unit 101. Downstream of the breast splitter and deboner unit 101 there is positioned a carcass unloader 103.

Figure 9:
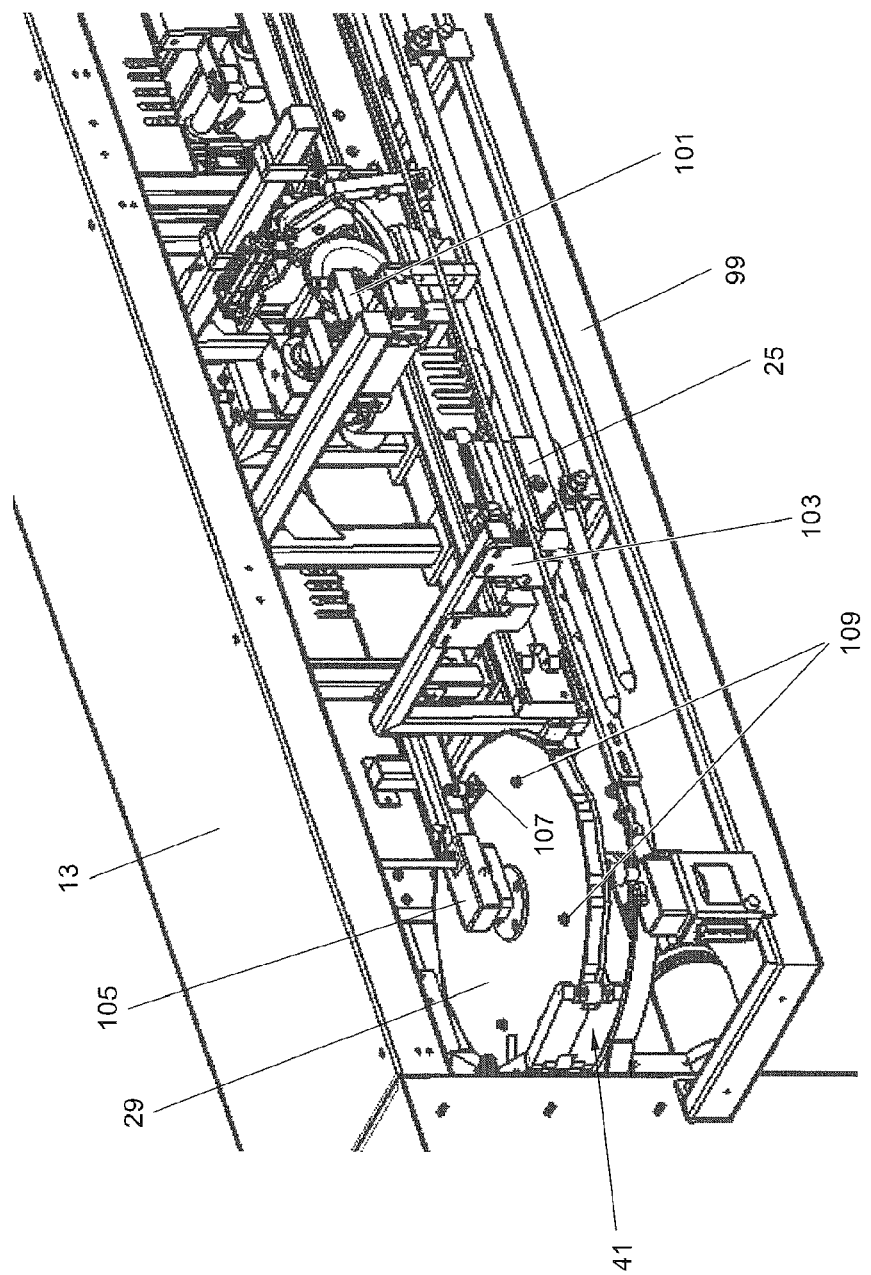
FIG. 9 is an enlarged detail of the reverse side of FIG. 8, but seen from an opposite direction.

FIG. 9 is an enlarged detail view of the third compartment 99 showing the breast splitter and deboner unit 101 and carcass unloader 103 upstream of the driven conveyor wheel 29. The driven conveyor wheel 29 is associated with an encoder 105 and an index reference sensor 107. The index reference sensor 107 cooperates with position indicia 109 provided on the driven conveyor wheel 29. Signals from the encoder 105 and the index reference sensor 107 are fed to a central control unit for control and surveillance of the machine operation.

Figure 10:
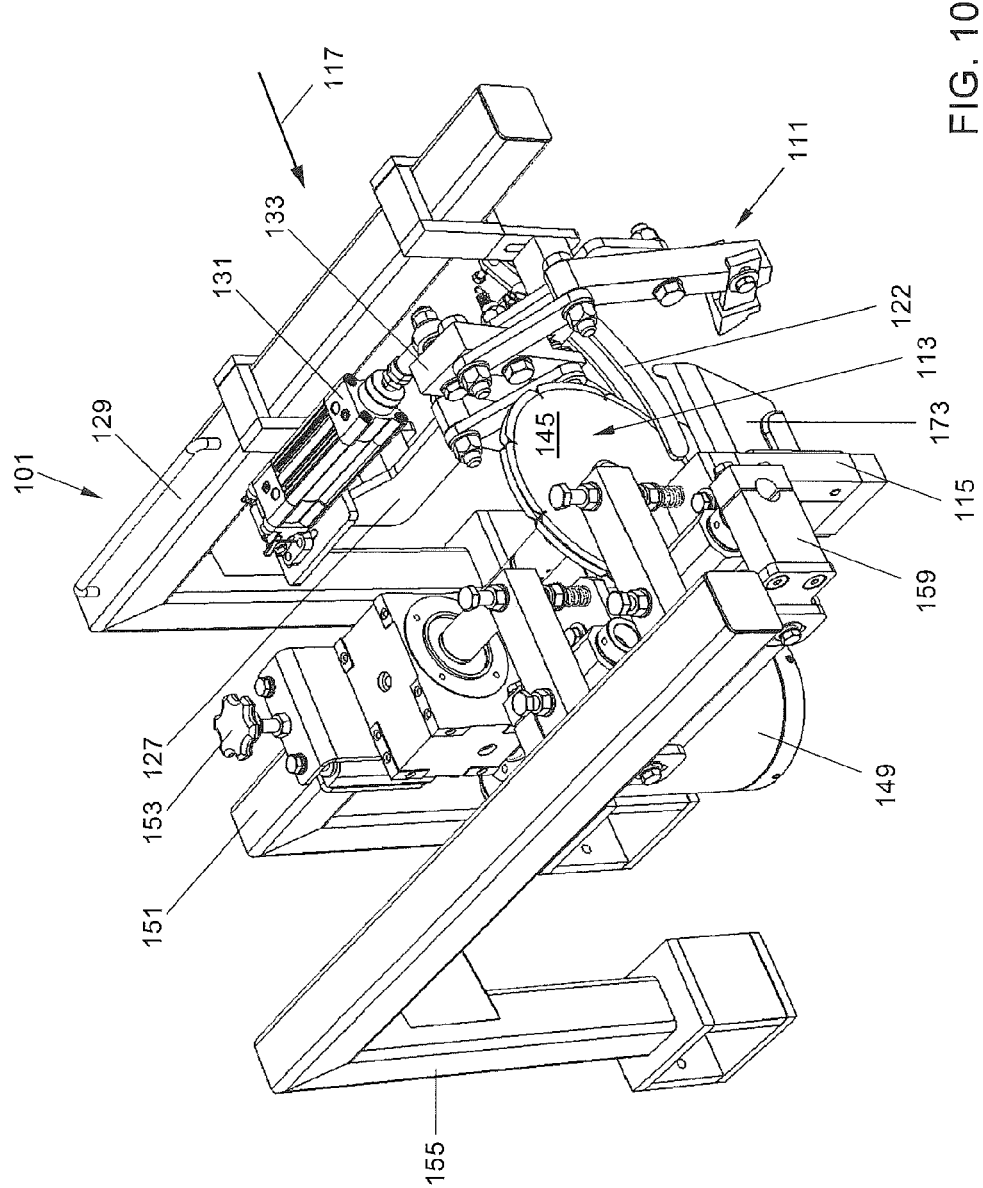
FIG. 10 shows a breast splitter and deboner unit as a subassembly detached from the machine of FIGS. 1 and 8.

FIG. 10 shows the breast splitter and deboner unit 101 as a subassembly detached from the machine. The breast splitter and deboner unit 101 includes a bone centering device 111, a breast cutter 113, and a breast fillet remover 115 arranged in an upstream to downstream direction 117. These individual devices are positioned to split and debone an entire breast cap.

Figure 11:
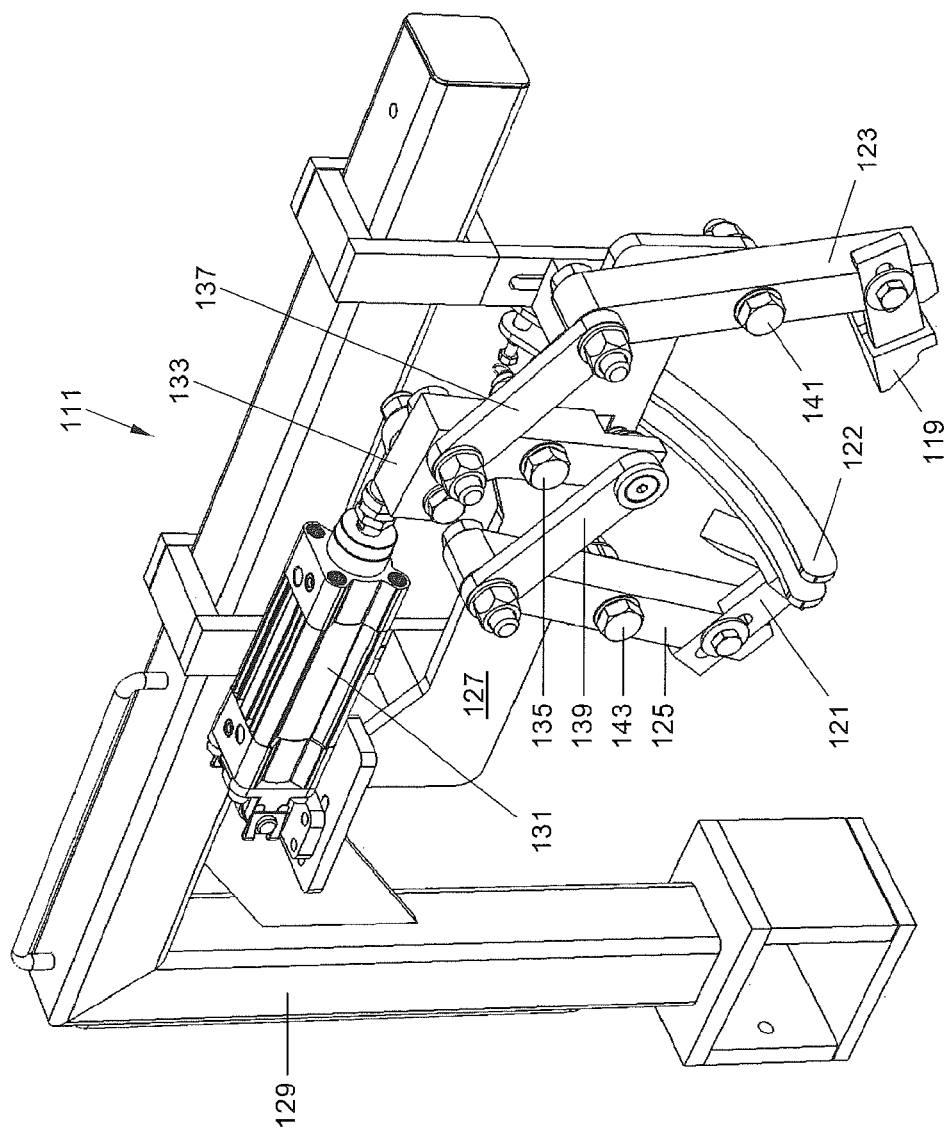
FIG. 11 in isolation illustrates a bone centering device of the breast splitter and deboner unit of FIG. 10.

FIG. 11 in isolation shows the bone centering device 111, which accomplishes centering of the wishbone in the breast cap to properly guide the breast cap into the breast cutter 113 and the breast fillet remover 115. To this end the bone centering device 111, includes a pair of opposite centering blocks 119, 121 adjustably mounted on first and second pivoting arms 123, 125. The centering blocks 119, 121 are positioned underneath and on opposite sides of a stationary central guide 122. The central guide 122 guides the breast caps in a vertical direction into the breast cutter 113. The pivoting arms 123, 125 are pivotally mounted on carrier subframe 127, while the carrier subframe 127 is adjustably attached to a detachable outrigger 129 that mounts to the machine frame of the main body 13 as shown in FIGS. 8 and 9. Also mounted on the carrier subframe 127 is a pneumatic actuator cylinder 131 that moves a rocker 133 that is pivoted centrally about a pivot journal 135 on the carrier subframe 127. A first connector link 137 is pivoted to an upper end of the rocker 133 and pivotally connects to an upper end of the first pivoting arm 123. A second connector link 139 is pivoted to a lower end of the rocker 133 and pivotally connects to an upper end of the second pivoting arm 125. With the first and second pivoting arms 123, 125 pivoted in their amidst about pivot shafts 141, 143, operation of the pneumatic actuator 131 will move the centering blocks 119, 121 towards and away from one another. The default position is for the centering blocks 119, 121 to be positioned close to one another, while the pneumatic actuator 131 is operated to move the centering blocks 119, 121 apart to allow the mandrel 25 and breast cap thereon to pass; after the wishbone has been centered. The vertical and horizontal position of the carrier subframe 127 can be adjusted by conventional means. Also the position of the actuator cylinder 131 can be adjusted with respect to the carrier subframe 127 to adjust the closing gap between the opposite centering blocks 119, 121, when underneath the stationary central guide 122.

Figure 12:
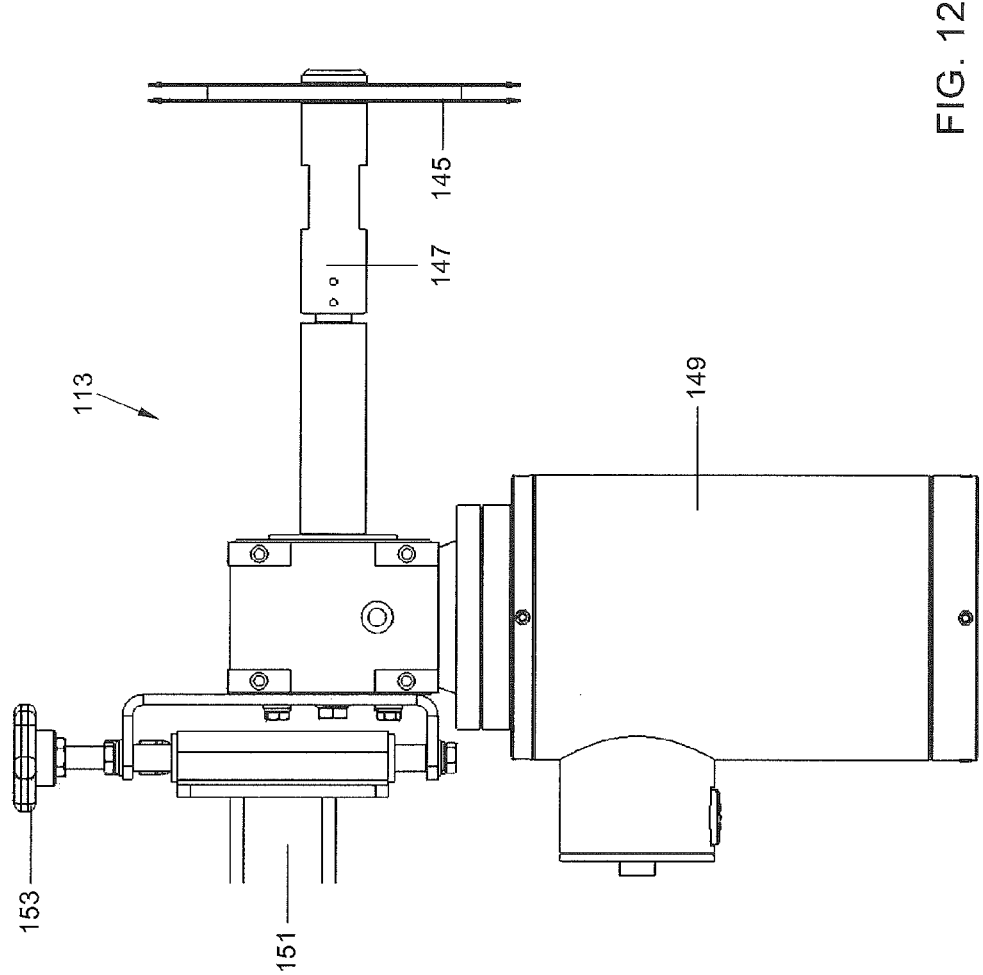
FIG. 12 illustrates in elevation a breast cutter of the breast splitter and deboner unit of FIG. 10.

FIG. 12 is a downstream elevation of the breast cutter 113. The breast cutter 113 is provided with a double circular cutting blade 145 mounted on a shaft 147. The shaft 147 is driven by a motor drive unit 149 which is adjustably suspended from an outrigger 151, which mounts to the machine frame as shown in FIGS. 8 and 9. A knurled wheel 153 is provided for adjusting the vertical position of the double cutting blade 145. Such a vertical adjustment may be necessary to adjust the cutting depth and also to compensate for wear after the cutting blade 145 has been re-sharpened. The exact position of the double cutting blade 145 in a horizontal direction is adjustable by varying the extent of the shaft 147 to center the cutting blade 145 with respect to the conveying path of the mandrels 25.

Figure 13:
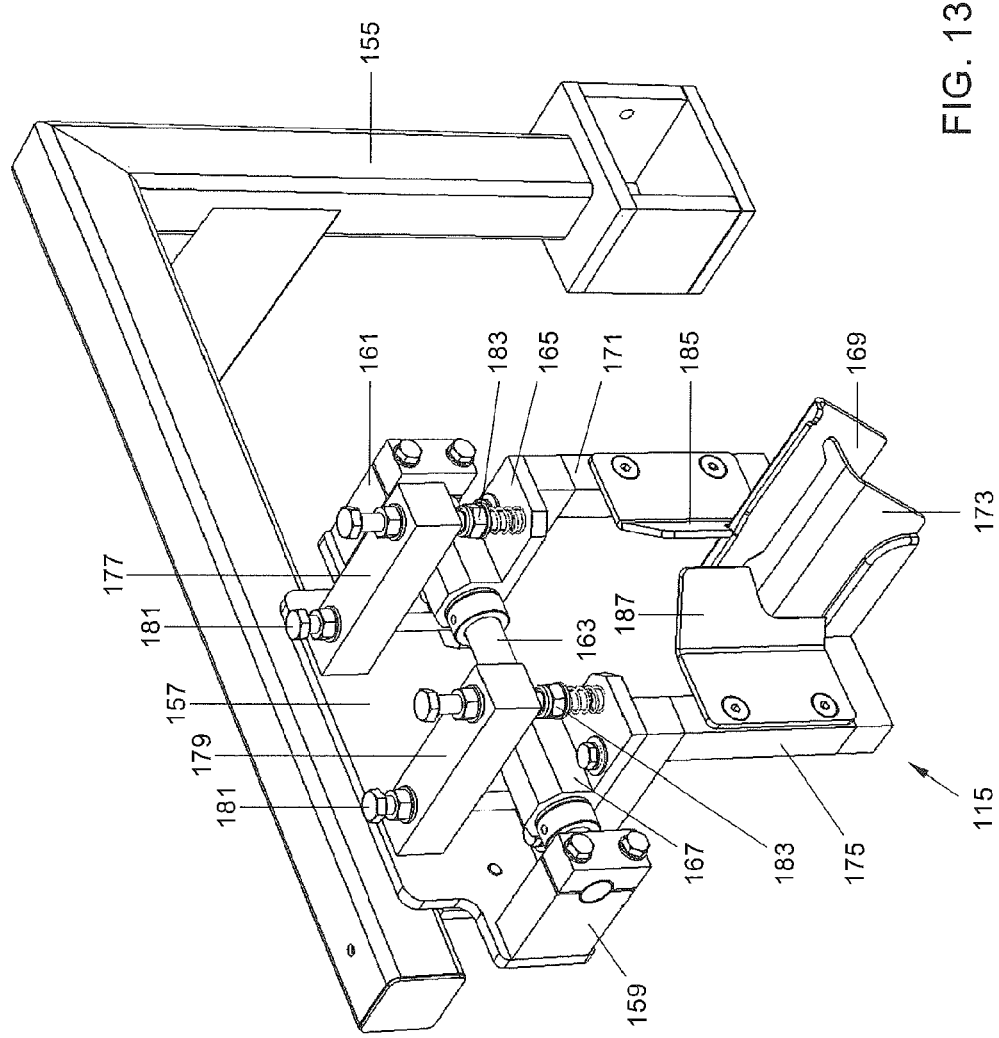
FIG. 13 illustrates in isolation a breast fillet remover of the breast splitter and deboner unit of FIG. 10.

FIG. 13 shows the breast fillet remover 115 from an upstream direction. The breast fillet remover 115 is again mounted to the machine frame through an outrigger 155. The outrigger 155 adjustably carries a carrier plate 157 with first and second rocker shaft supports 159, 161 on opposite lateral ends of the carrier plate 157. A rocker shaft 163 extending between the first and second rocker shaft supports 159, 161 carries first and second pivoting sleeved 165, 167. The first pivoting sleeve 165 carries a first tunnel plate 169 from an arm 171 and the second pivoting sleeve 167 carries a second tunnel plate 173 from a corresponding arm 175. Further affixed to the carrier plate 157 are a first end stop holder 177 and a second end stop holder 179. Both the first and second end stop holders 177, 179 have an extend perpendicular to the carrier plate 157 and parallel to the first and second rocker shaft supports 159, 161. Each of the first and second end stop holders 177, 179 has an adjustable swivel stop 181 for the respective first and second pivoting sleeve 165, 167. Adjacent a free end thereof the first and second end stop holders 177, 179 are each provided with spring tension adjusters 183. The above described arrangement allows for limited spring biased swiveling of the first and second tunnel plates 169, 173 independently of each other. It is further seen in FIG. 13 that the first and second tunnel plates 169, 173 at a downstream end terminate in respective first and second fillet spreaders 185, 187.

Figure 14:
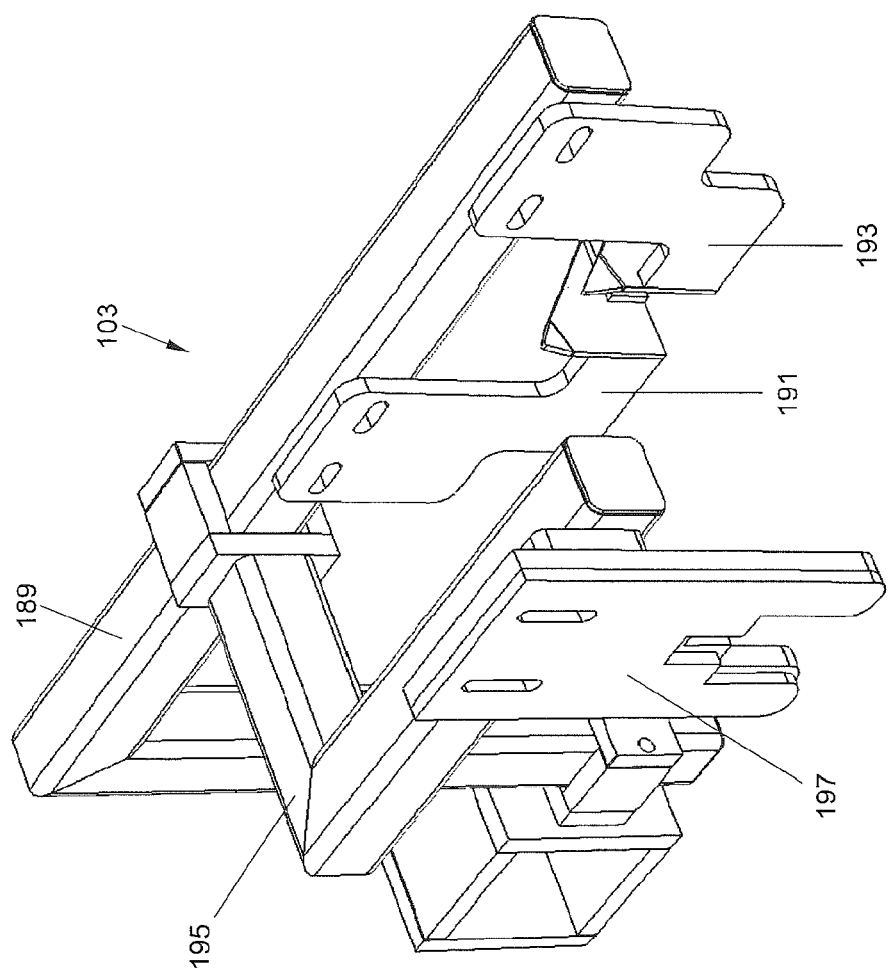
FIG. 14 shows a carcass unloader as a subassembly detached from the machine of FIGS. 1 and 8.

FIG. 14 shows the carcass unloader 103 detached from the machine and viewed from a downstream end thereof. A first outrigger 189 serves to mount first and second lifting unloaders 191, 193 to the machine to be in register with the path through which the mandrels 25 are conveyed. A second outrigger 195 is adjustably attached to the first outrigger 189 and mounts a secondary soft unloader 197 in respect of the first and second lifting unloaders 191, 193.

Accordingly a method and system is described for automatically deboning poultry breast caps containing meat and a skeletal structure to obtain breast fillets. The method includes providing a mandrel 25 with a plane of symmetry in a vertical orientation and supporting a breast cap having a neck end and a tail end with its skeletal structure including a keel bone on top of the mandrel 25. The breast cap being held to the mandrel 25 with the keel bone aligned with the plane of symmetry. By moving the mandrel 25 through a conveying path extending through a substantially horizontal plane in a direction of travel 27 it passes a cutting implement 145 of a breast cutter 113 engaging the meat along the keel bone. The cutting implement 145 causes at least one incision along the area where the meat is attached to the keel bone and a breast fillet remover 115 downstream of the breast cutter 113 engages between the skeletal structure and the meat and separates the meat as a pair of single fillets from the skeletal structure. The arrangement is such that the mandrel 25 moves through the conveying path with the plane of symmetry aligned with the direction of travel 27.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

What is claimed is:

1. Method of automatically deboning poultry breast caps containing meat and a skeletal structure to obtain breast fillets therefrom, including:
   obtaining a mandrel having a plane of symmetry in vertical orientation;
   supporting a breast cap having a neck end and a tail end with its skeletal structure including a keel bone on top of the mandrel;
   holding the breast cap to the mandrel with the keel bone aligned with the plane of symmetry of the mandrel;
   moving the mandrel through a conveying path that extends through a substantially horizontal plane;
   obtaining a breast cutter in the conveying path;
   moving the mandrel through a conveying path in a direction of travel to pass the breast cutter for engagement with the meat along the keel bone;
   making at least one incision along the area where the meat is attached to the keel bone;
   obtaining a breast fillet remover downstream of the breast cutter;
   allowing the breast fillet remover to engage between the skeletal structure on the mandrel and the meat; and
   separating the meat as a pair of single fillets from the skeletal structure,
   wherein the mandrel is being moved through the conveying path with the plane of symmetry aligned with the direction of travel.

2. Method according to claim 1, further including a step of de-skinning prior to moving the mandrel to pass the breast cutter.

3. Method according to claim 2, wherein the mandrel is being moved through the conveying path with the neck end of the breast cap leading and the tail end trailing, but wherein prior to engagement of the meat with the breast cutter the mandrel, within its plane of symmetry, is brought into an upside-down position with the tail end of the breast cap leading for de-skinning and returned back again to its initial position after passing the de-skinner.

4. Method according to claim 2, further including a step of pre-cutting the neck end prior to the step of de-skinning.

5. Method according to claim 1, further comprising unloading the skeletal structure from the mandrel after separating of the meat therefrom.

6. Method according to claim 1, wherein the breast cutter includes a pair of spaced parallel cutting blades for providing a pair of spaced parallel incisions along the area where the meat is attached to the keel bone.

7. System for performing the method according to claim 1.

8. System according to claim 7, comprising an endless conveyor arranged in a substantially horizontal plane and including a pair of substantially parallel straight sections, which are joined by opposite first and second curved sections extending about spaced first and second conveyor wheels.

9. System according to claim 8, comprising a conveyor chain and a plurality of mandrels entrained for movement through the conveying path in the direction of travel by the conveyor chain.

10. System according to claim 9, wherein the conveyor chain includes individual chain links and each mandrel being associated with an intermediate chain link, between a leading chain link and a trailing chain link.

11. System according to claim 10, wherein each intermediate chain link supports a Maltese cross arranged to be rotatable in a vertical plane between at least two indexed positions.

12. System according to claim 11, wherein the mandrel is fixedly connected to the Maltese cross by a shaft to extend with its plane of symmetry parallel to the plane of rotation of the Maltese cross.

13. System according to claim 11, wherein inwardly extending diagonal slots in the Maltese cross are adapted to engage detents along a bottom edge of a guide channel for guiding and supporting the conveyor chain in a straight section of the conveyor, and wherein engagement of the detents and the diagonal slots causes each mandrel to turn through 180° in its plane of symmetry.

14. System according to claim 7, comprising a loading section for loading poultry breast caps onto mandrels and at least two compartments each adapted to selectively receive at least one exchangeable meat processing module.

15. System according to claim 14, wherein the at least one exchangeable meat processing module includes a breast splitter and deboner unit.

16. System according to claim 15, wherein the at least one exchangeable meat processing module further includes a de-skinner unit, arranged to be received in one of the at least two compartments in optional operative and non-operative modes.

17. System according to claim 15, wherein the deboner unit in the direction of travel includes a bone centering device, the breast cutter, and the breast fillet remover.

18. System according to claim 17, wherein the bone centering device comprises a stationary central guide for guiding breast caps in a vertical direction and a pair of centering blocks oppositely movable transverse to the direction of travel for centering wishbones in the breast caps.

19. System according to claim 17, wherein the breast cutter includes a cutting implement adapted to cause in use at least one incision along the area where the meat is attached to the keel bone.

20. System according to claim 19, wherein the cutting implement is in the form of a rotatable double circular cutting blade.

21. System according to claim 17, wherein the breast fillet remover includes complementary first and second tunnel plates mounted for limited individual swiveling movement.

* * * * *